US005262902A

United States Patent [19]

Okumura et al.

[11] Patent Number: 5,262,902

[45] Date of Patent: Nov. 16, 1993

[54] FILTER FOR A LOW-PRESSURE MERCURY VAPOR LAMP

[75] Inventors: Katsuya Okumura; Kazuo Kinoshita, both of Kanagawa, Japan

[73] Assignees: Ebara Corporation, Tokyo; Kabushiki Kaisha Toshiba, Kawasaki, both of Japan

[21] Appl. No.: 970,583

[22] Filed: Oct. 26, 1992

Related U.S. Application Data

[63] Continuation of Ser. No. 722,632, Jun. 27, 1991, abandoned.

[30] Foreign Application Priority Data

Jun. 28, 1990 [JP] Japan .................................. 2-168511

[51] Int. Cl.[5] .................................................. G02B 5/22

[52] U.S. Cl. ..................................... 359/885; 250/398; 250/504 R; 313/44; 313/112; 313/565

[58] Field of Search ................ 359/885, 886; 250/398, 250/372, 435, 504 R, 505.1; 313/111, 565, 112, 490, 44

[56] References Cited

U.S. PATENT DOCUMENTS

| | | | |
|---|---|---|---|
| 4,049,987 | 8/1977 | Helms | 313/112 |
| 4,054,812 | 10/1977 | Lessner et al. | 313/44 |
| 4,143,468 | 3/1979 | Novotny et al. | 250/398 |
| 4,591,958 | 5/1986 | Lamboo | 250/504 R |
| 4,636,686 | 1/1987 | Vrieze | 313/565 |
| 4,924,142 | 5/1990 | Kaldenhoven | 313/565 |

FOREIGN PATENT DOCUMENTS 792615 1/1936 France .

OTHER PUBLICATIONS

Patent Abstracts of Japan, vol. 5, No. 204 (C-085) Dec. 24, 1981 and JP-A-56 125 207 (Toshiba Corp) Oct. 1, 1981.

"Ozone Absorption Coefficients in the Visible and Ultraviolet Regions", Advances in Chemistry Series, pp. 263-268.

"Irradiated Lithium Fluoride as an Optical Filter in the Far Ultra-Violet", Nature, Sep. 16, 1961, vol. 191.

"Experimental Technique for Quantitative Study of Photochemical Reactions", J. Phy. Chem., vol. 32, 1928.

"Die Bestimmung der Lichtintensität von Niederdruck--Quecksilberlampen bei 1849 Å", Z. Natrufosch, vol. A19, 1964.

"Vacuum Ultraviolet Photochemistry", Advances in Photochemistry, vol. III.

"Ozone Filter for Selecting 185-nm Radiation from Mercury Vapor Lamps", The Journal of Physical Chemistry, vol. 74, No. 24, 1970.

*Primary Examiner*—Loha Ben

*Attorney, Agent, or Firm*—Nikaido, Marmelstein, Murray & Oram

[57] ABSTRACT

A filter for absorbing radiation of a selected wave length emitted from a mercury vapor lamp is disclosed. The filter comprises a device for providing an ozone-containing gas layer positioned between the mercury vapor lamp and an object to be illuminated, which may be formed by providing a transparent space filled with the ozone-containing gas between the lamp and the object. This provides a relatively large sized filter which has a simple construction.

6 Claims, 3 Drawing Sheets

FILTER FOR A LOW-PRESSURE MERCURY VAPOR LAMP

This application is a continuation of application Ser. No. 07/722,632 filed Jun. 27, 1991 now abandoned.

BACKGROUND OF THE INVENTION

1. Field of the Invention

The present invention relates to a filter for a low-pressure mercury vapor lamp.

2. Prior Art

In recent years, low-pressure mercury vapor lamps have been used as a light-source for a photo-CVD, photo etching, etc.

Such lamps have emission lines of 185 and 254 nm in wave-length and, when only radiation of 185 nm should be used for particular applications in a photo-CVD, photo etching, etc. filters coated with a dielectric layer have been used for filtering 254 nm radiation. However, since such filters have limitations with respect to their size originating from limitations related to the coating installation, large-size filters are hardly available. Even though large-size filters are available through special coating installation, they are extremely expensive. Further, they have a drawback in that they quickly deteriorate since they absorb ultraviolet radiation.

SUMMARY OF THE INVENTION

An object of the present invention is therefore, to solve the above-mentioned problems by providing a filter for low-pressure mercury vapor lamps which is simple in construction, can be made relatively large without any size limitation, and further will not deteriorate.

To achieve the above-mentioned object, the present invention provides a gas filter for a low-pressure mercury vapor lamp which comprises means for providing an ozone-containing gas layer between the low-pressure mercury vapor lamp and an object to be illuminated.

Preferably, an enclosed space is formed by using quartz plates, ozone is introduced into the space, and the space is so positioned that it interrupts radiation from the low-pressure mercury vapor lamp. Thus, the radiation from the mercury vapor lamp passes through the ozone layer, where 254 nm radiation is absorbed, so that only 185 nm radiation can be obtained.

When ozone ($O_3$) absorbs ultraviolet radiation within a range of from 200 to 300 nm, it dissociates as follows:

$$O_3 \rightarrow O_2 + O$$

The absorption peak is at or near 255 nm and the absorption coefficient reaches as high as 140 $atm^{-1} \cdot cm^{-1}$.

Therefore, for example, if the ozone layer is of 10% concentration (90% $O_2$) and is 2 mm in thickness and at atmospheric pressure, then radiation of 250 nm will, after passing through such ozone layer, have an intensity which is expressed as follows:

$$I = I_0 exp\,(-\alpha pl)$$

where

I represents the intensity of the radiation after the passage;

$I_o$ represents the intensity of the incident radiation;

$\alpha$represents the absorption coefficient ($atm^{-1} \cdot cm^{-1}$);

p represents the pressure (atm); and l represents the length of the optical path.

By substituting $\alpha = 140$, $p = 0.1$ and $l = 0.2$, the following can be obtained from the above expression:

$$I = I_0 \times 0.061$$

That is, about 94% of the radiation of 250 nm will be absorbed.

As a radiation source which emits radiation in the vacuum ultra-violet range, ArF excimer lasers (193 nm) are now available. The excimer lasers, however, are costly and also the running cost for them is far expensive as compared with mercury vapor lamps. Therefore, it is far benefitial to use mercury vapor lamps as a radiation source.

Though mercury vapor lamps can provide only a smaller quantity of photons per unit surface area as compared with excimer lasers, they are capable of providing continuous illumination whereas the excimer lasers are only capable of providing pulsing illumination.

Further, mercury vapor lamps have a great merit in that the wavelength is by 8 nm shorter than that of ArF, 193 nm. For example, when producing ozone from oxygen ($O_2$) through photochemical reactions, radiation of 185 nm has an efficiency which is 1,000 times higher than radiation of 193 nm. This is because 193 nm radiation has an absorption coefficient of $10^{-3}$ $atm^{-1} \cdot cm^{-1}$ for $O_2$ whereas 185 nm radiation has a value of 1 $atm^{-1} \cdot cm^{-1}$. In addition, since ozone is converted into $O_2$ again when it absorbs radiation at or near 250 nm, in conventional low-pressure mercury vapor lamps having radiation of 185 and 254 nm in wavelength, it can hardly be expected to produce ozone with a reasonable production efficiency. Meanwhile, in accordance with the present invention, since 254 nm radiation can be effectively filtered, a process of producing $O_3$ from $O_2$ using a conventional low-pressure mercury vapor lamp as the radiation source becomes possible.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENTS

The present invention will now be described in detail, with reference to the drawings. The present invention, however, is not limited to the embodiments therein.

EMBODIMENT 1

Figure 1:
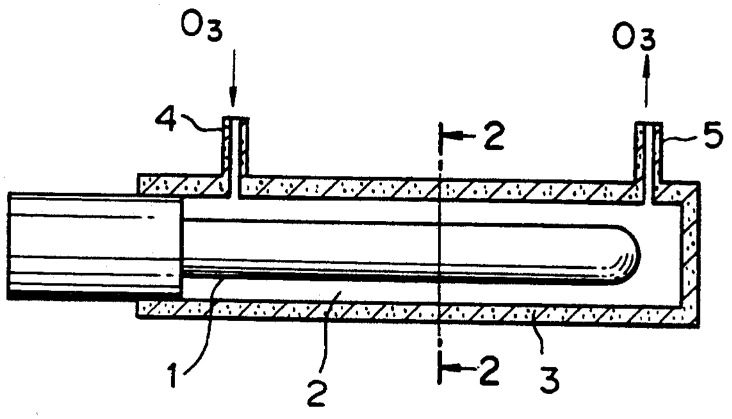
FIG. 1 is a longitudinal sectional view showing an embodiment of the gas filter according to the present invention.
Figure 2:
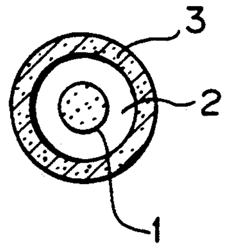
FIG. 2 is a cross sectional view taken along lines 2—2 in FIG. 1.

FIG. 1 is a longitudinal sectional view showing an embodiment of the gas filter according to the present invention. FIG. 2 is a cross sectional view taken along lines 2—2 of FIG. 1.

In FIG. 1, 1 designates an ordinary bar-shaped mercury vapor lamp available on the market. 3 designates a transparent quartz glass vessel having an inner diameter larger than the outer diameter of the lamp 1, and having a gas inlet 4 and an outlet 5. 2 designates an annular space formed between the lamp 1 and the glass vessel 3. Ozone of a suitable concentration is introduced through the gas inlet 4, whereby the space 2 is filled with ozone. Radiation from the mercury vapor lamp 1 is emitted out of the quartz tube 3 through this ozone layer 2, where most of 254 nm radiation is absorbed by the ozone layer. Thus, only 185 nm radiation, which is not absorbed by this layer, is emitted out of the quartz tube 3.

EMBODIMENT 2

Figure 3:
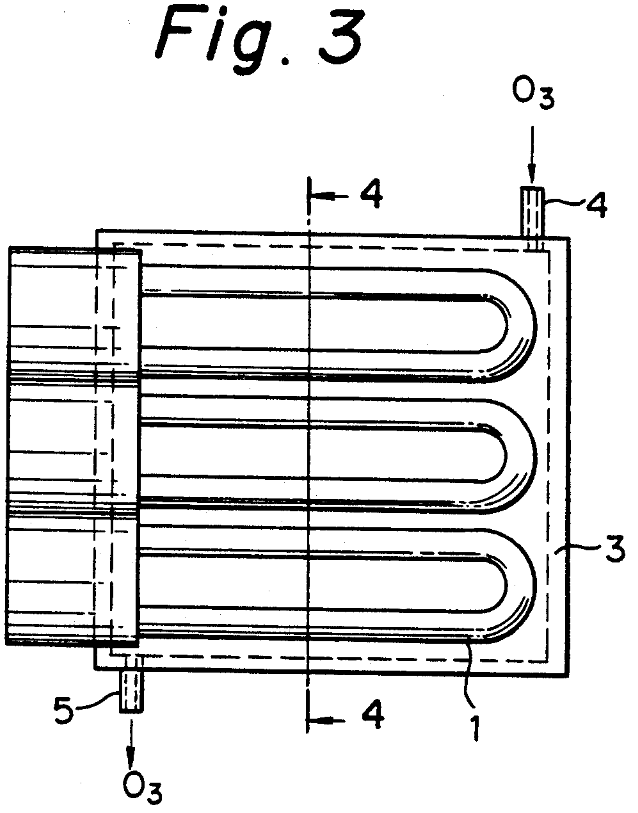
FIG. 3 is a plan view showing another embodiment of the gas filter according to the present invention.
Figure 4:
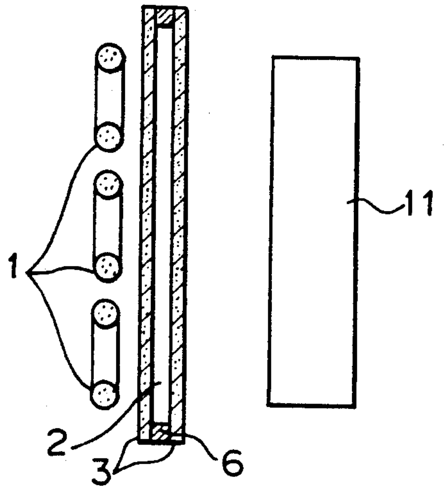
FIG. 4 is a sectional view taken along lines 4—4 in FIG. 3.

FIG. 3 is a plan view showing an example requiring a large-area gas filter according to the present invention. FIG. 4 is a sectional view taken along lines 4—4 in FIG. 3.

In FIGS. 3 and 4, 1 designates U-shaped mercury vapor lamps arranged in a row and 3 designates transparent quartz plates having a suitable thickness. An enclosed space 2 of arbitrarily selected thickness, separated from ambient air, may be provided between the two opposite quartz plates 3 by interposing spacers 6 of uniform thickness between the two quartz plates 3 along the periphery thereof and providing a seal between the spacers 6 and the quartz plates 3 with a sealant or the like. Ozone is introduced into the space 2 using a gas inlet 4 and an outlet 5 attached to the peripheral spacers at suitable positions. With the filter being positioned between an object 11 to be illuminated and the mercury vapor lamps 1, radiation from the low-pressure mercury vapor lamps 1 enters the ozone layer 2, where 254 nm radiation is effectively absorbed, and only 185 nm radiation, for which ozone does not have an absorption band, can reach the object 11 to be illuminated.

EMBODIMENT 3

Figure 5:
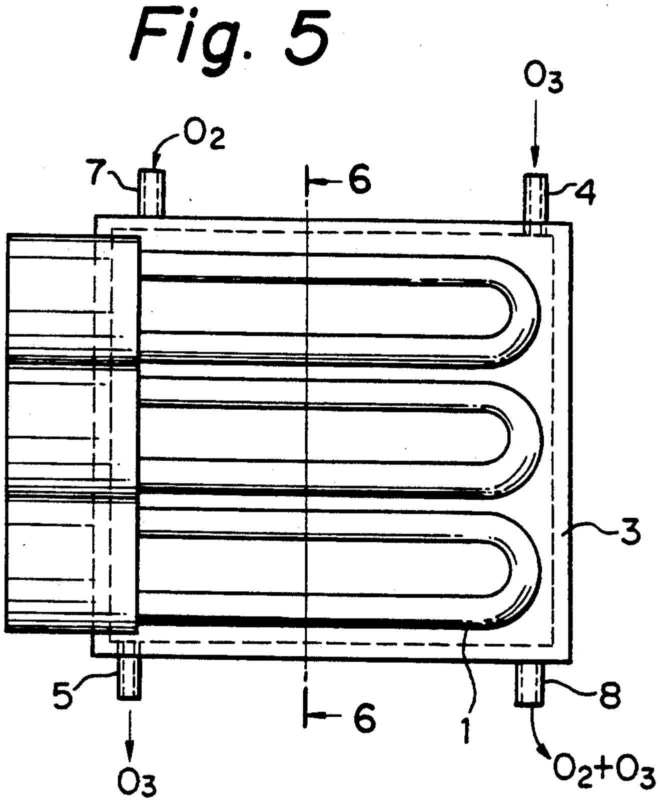
FIG. 5 is a plan view showing the gas filter of FIG. 3 used for producing ozone.
Figure 6:
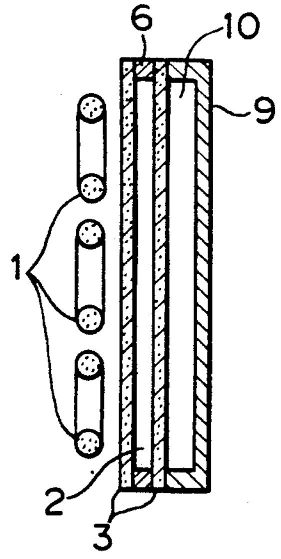
FIG. 6 is a sectional view taken along lines 6—6 in FIG. 5.

FIG. 5 is a plan view of an ozone producing apparatus formed by using the large-area gas filter of FIG. 2 embodiment. FIG. 6 is a sectional view taken along lines 6—6 in FIG. 5.

In FIGS. 5 and 6, 1 designates U-shaped mercury vapor lamps arranged in a row and 3 designates transparent quartz plates having a suitable thickness. A first enclosed space 2 of an arbitrarily selected thickness, separated from ambient air, may be provided between the opposite two quartz plates 3 by interposing spacers 6 of uniform thickness between the two quartz plates 3 along the periphery thereof and providing a seal between the spacers 6 and the quartz plates 3 with a sealant or the like. Ozone is introduced into the space 2 using a gas inlet 4 and an outlet 5 attached to the spacers at suitable peripheral positions.

9 designates a box-shaped vessel which is made of a suitable material such as a synthetic resin and is arranged outside of one of the two quartz plates which is remote from the mercury vapor lamps 1. A second enclosed space 10, separated from ambient air, may be formed by providing a seal between the periphery of the box-shaped vessel 9 and the quartz plates 3 using a sealant or the like. Oxygen or air is introduced into the space 10 using an inlet 7 for a raw material gas and an outlet 8 for the reaction gas, which are attached to the vessel at suitable positions.

Since the radiation from the low-pressure mercury vapor lamps 1 have passed through the ozone filter 2, oxygen or air in the space 10 is irradiated with only 185 nm radiation which is useful for producing ozone from oxygen or air. Ozone so produced is clean, not containing dust or the like, because it is produced without involving the phenomenon of electric discharge associated with prior art ozone producing apparatus. Such clean ozone may be preferably used in a semiconductor producing process or the like in which such dust should be precluded.

The filter of the invention makes it possible to effectively obtain only radiation of a short wavelength, 185 nm, in the vacuum ultraviolet range from low-pressure mercury vapor lamps.

Also, since the obtainable radiation is a monochromatic radiation of wavelength shorter than that of ArF excimer laser radiation (193 nm), various applications in fields of photo-CVD, photochemical synthesis, photoetching, etc., is possible.

What is claimed is:

1. A filter for absorbing radiation of a selected wavelength emitted from a plurality of low-pressure mercury vapor lamps arranged in a row, comprising a gas layer providing means between said low-pressure mercury vapor lamps and an object to be illuminated, said gas layer providing means including an enclosed space of suitable thickness formed by two opposite transparent quartz plates spaced by means of peripheral spacers interposed therebetween filled with an ozone containing gas.

2. A filter claimed in claim 1, wherein said mercury vapor lamps have emission lines of 185 nm and 254 nm in wavelength and said gas layer providing means absorbs radiation of 254 nm radiation while allowing passage of radiation of 185 nm.

3. A filter claimed in claim 1, wherein said mercury vapor lamps are U-shaped lamps.

4. A filter claimed in claim 1, wherein said spacers include a gas inlet and a gas outlet for respectively introducing said ozone-containing gas in said enclosed space and exhausting the gas therefrom.

5. An ozone-producing apparatus comprising:

a plurality of mercury vapor lamps arranged in a row, a filter for absorbing radiation of a selected wave length emitted from said lamps which comprises a first enclosed space of a suitable thickness formed by two opposite transparent quartz plates spaced by means of peripheral spacers interposed therebetween, a gas inlet and gas outlet for respectively introducing an ozone-containing gas into said first enclosed space and exhausting the gas therefrom, and a box-shaped vessel provided outside of one of said two quartz plates which is remote from said mercury vapor lamps for forming a second enclosed space therebetween, said box-shaped vessel including an inlet and an outlet for respectively introducing a raw material gas such as oxygen or air into and discharging a reaction gas out of said second enclosed space.

6. An ozone-producing apparatus claimed in claim 5, wherein said mercury vapor lamps are U-shaped lamps.

* * * * *